April 4, 1967 A. P. H. OVERMENT 3,312,221
URINARY DRAINAGE APPARATUS
Filed Oct. 25, 1963 3 Sheets-Sheet 1
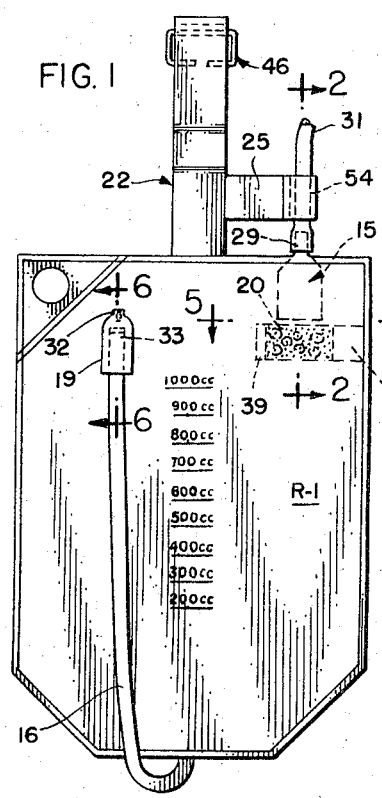
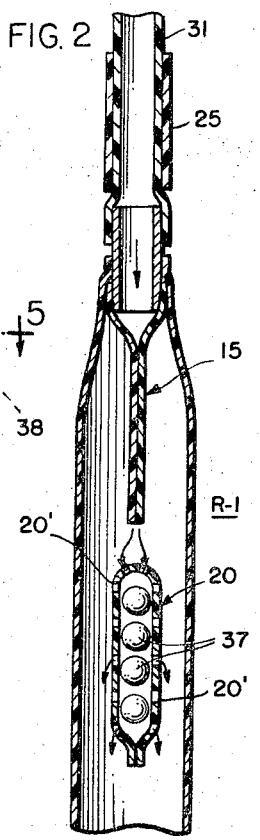
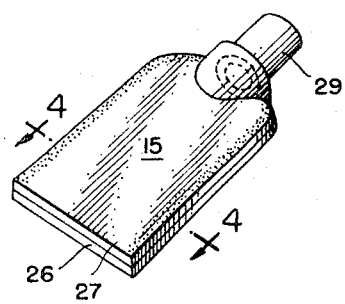
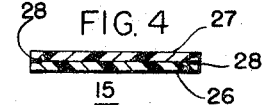
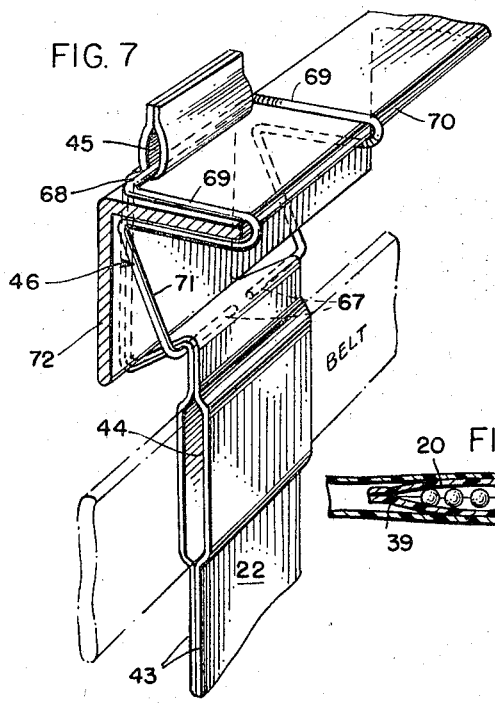
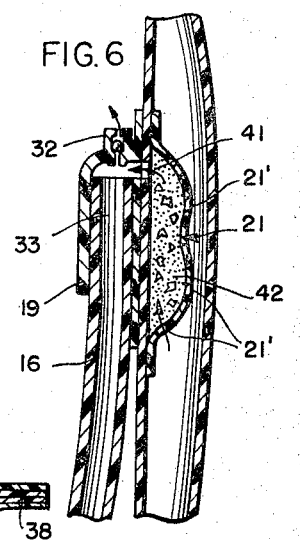
INVENTOR:
ALFRED P. H. OVERMENT
BY
ATT'YS

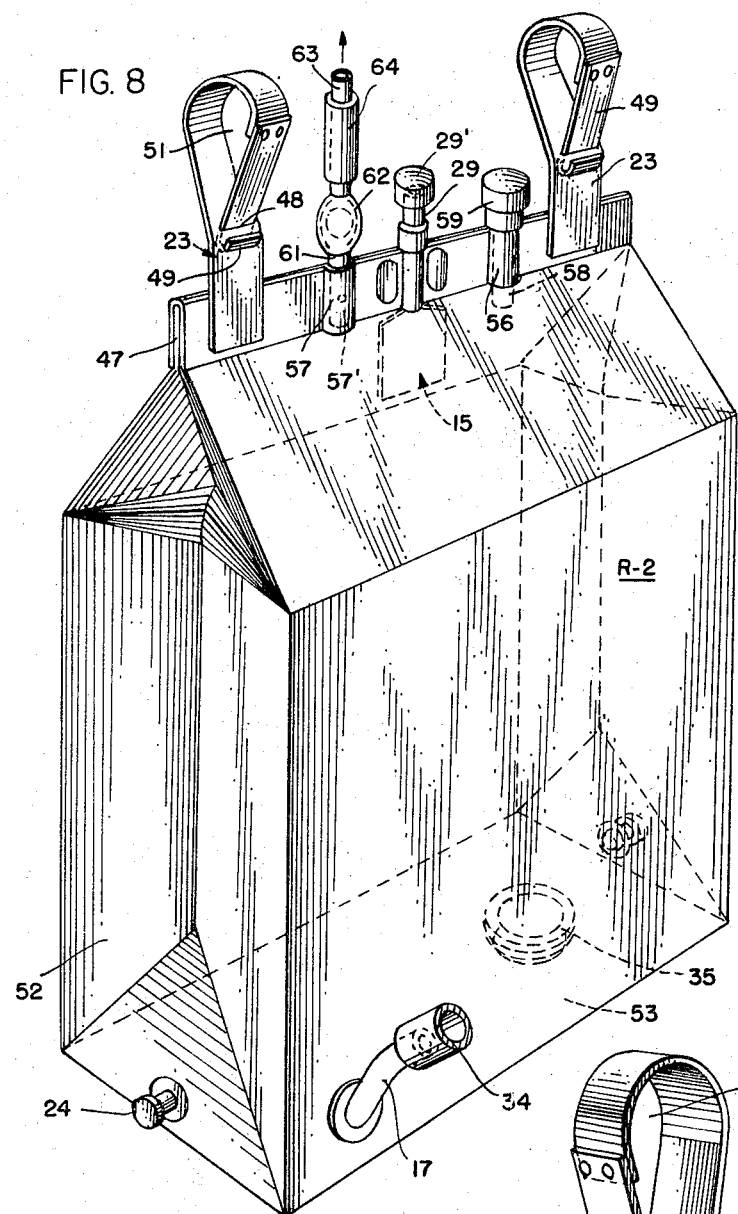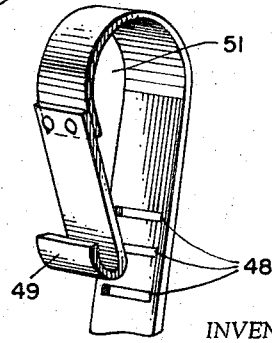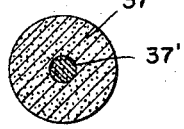

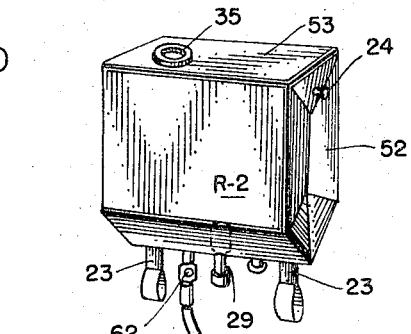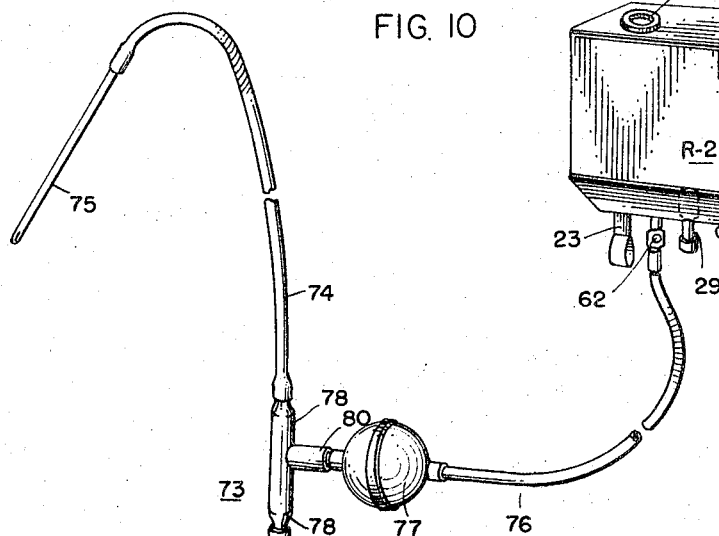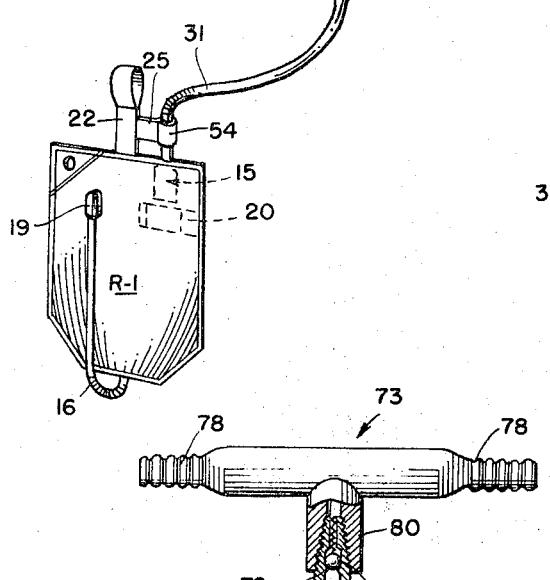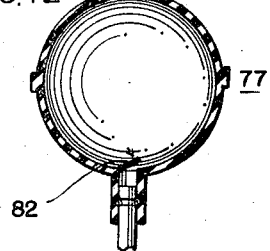

United States Patent Office 3,312,221
Patented Apr. 4, 1967

3,312,221
URINARY DRAINAGE APPARATUS
Alfred P. H. Overment, 4016 N. Central Park,
Chicago, Ill. 60618
Filed Oct. 25, 1963, Ser. No. 318,895
11 Claims. (Cl. 128—275)

This invention relates to equipment for use with urological patients.

Patients subject to urological surgery require the extraction of samples of urine from and the drainage and irrigation of the bladder. This requires the use of the most sanitary facilities and methods in order to prevent any possibility of infection. Often continuous bladder drainage is required for protracted periods during which the extraction of samples of urine is required. On other occasions provision has to be made for merely draining the bladder for a limited period; and many times provision has to be made for periodically irrigating as well as draining the bladder. Currently, hospitals have on hand equipment for repeated use for these purposes. Obviously, such equipment requires very careful sterilization after each use to ensure the elimination of all bacteria that might cause infection to a subsequent user of the equipment. This poses difficult problems with respect to both storage and handling as well as the primary objective of absolute sterility in all operative procedures.

Also, with the currently available apparatus and present operational procedures, there still remains the very serious problem of preventing entrance of bacteria into the patient's bladder through the necessary handling of equipment in the course of drainage and irrigation operations. Any opening of the fluid flow system, whether for emptying the receptacle, taking samples or specimens, the introduction of medication, or the changing from the drainage function to irrigation and then back to drainage, presents an opportunity for bacteria to enter the system. Thus, an ideal system would be one which, when once installed and connected with the patient, would never be opened to ambient atmosphere until the time for its removal.

The main objects of this invention, therefore, are to provide an improved system and equipment for use with surgical patients who require urological drainage procedures; to provide improved disposable equipment of this kind suitable for use over periods of either short or long duration; to provide an improved form of receptacles which may be used individually for the drainage of the bladder or jointly in a completely and continuously closed system for both irrigation and drainage of the bladder; to provide an improved form of flutter valve for such receptacles which positively seals off the inlet opening against backflow of the receptacle contents into the drainage tube; to provide an improved means within the receptacle for ensuring against any possibility of ascending infection or offensive odors; to provide improved means for retaining the receptacle discharge-tube in position to prevent unwanted escape of the contents of the receptacle; to provide an improved form of means for suspending the receptacle in use position from a bed or on an ambulatory patient; to provide improved means for attaching and supporting the inflow tube to the receptacle to ensure against all possibility of so crimping the tube adjacent the receptacle as to shut off flow into the receptacle; to provide an improved means for suspending the receptacle from the patient's bed so as to avoid any possible contact with the receptacle by hospital personnel moving about the bed for attention to the patient; to provide an improved arrangement of two receptacles in a fully and continuously closed system for draining and irrigating a patient's bladder; and to provide urological equipment of this kind of such simple and practical construction as to make possible the economical manufacture thereof from plastic materials for sterilized assembly in packaged kits subject to convenient storage ready for one-use disposal thereof.

Specific embodiments of apparatus and a system according to my invention are shown in the accompanying drawings in which:

FIGURE 1 is a front elevational view of one form of receptacle constructed for use in accordance with this invention;

FIG. 2 is an enlarged, fragmentary, cross-sectional view taken on the plane of the line 2—2 of FIG. 1;

FIG. 3 is a perspective view of my improved flutter valve for use with any of the hereinshown forms of receptacle employed in accordance with this invention;

FIG. 4 is a transverse cross-sectional detail of the said flutter valve, as taken on the line 4—4 of FIG. 3;

FIG. 5 is an enlarged, fragmentary, cross-sectional detail taken on the plane of the line 5—5 of FIG. 1 to show the manner of mounting a germicide receptacle;

FIG. 6 is an enlarged, fragmentary, cross-sectional detail taken on the line 6—6 of FIG. 1;

FIG. 7 is a perspective view of an improved form of wire-bracket for suspending a drainage receptacle from the patient's bed;

FIG. 8 is a perspective view of a modified form of receptacle, constructed in accordance with this invention, adapted for use either as a drainage receptacle or as an irrigation component of a closed system;

FIG. 9 is an enlarged, perspective view of one of the hanger straps used for the receptacle shown in FIG. 8;

FIG. 10 is a perspective view of a closed system according to my invention for use in urological irrigation and drainage procedures;

FIG. 11 is a front elevational view of another modification of a receptacle, constructed in accordance with this invention, for use in taking a sample of urine for laboratory examination;

FIG. 12 is a detail view, partly sectional, of the T connector and hand-pump incorporated in the closed system shown in FIG. 10; and FIG. 13 is a sectional view of one of the bactericidal pellets employed with the drainage receptacle shown in FIGS. 1 and 2.

The essential concept of this invention relates to sterile-packaged equipment, for one-time use with urological patients, and involves the improved construction of the receptacle components of a closed system for bladder irrigation and drainage whereby the entrance of bacteria into the system because of fluid counter-flow is obviated; and whereby the use and handling of the receptacle is simplified and facilitated to assure an improved asceptic technique that prevents all possibility of direct infection of the patient.

Equipment, of the class described, embodying the foregoing concept comprises recepticles R–1, R–2 and R–3 each of which encloses an in-flow flutter valve 15 and has attached a drain tube 16, 17 or 18, respectively, the receptacle R–1 having a pocket 19 for retaining the open end of the drainage tube 16 in elevated position on the receptacle, a germicidal pouch 20 adjacent the flutter valve 15, and a deodorizing pouch 21 adjacent the pocket 19 as shown, the receptacles R–1 and R–2 are provided with suspension straps 22 or 23 and hanger trunnions 24, the first of which straps 22 mounts a drainage-tube brace 25, and the assembly is such that the receptacles R–1 and R–2 may be variously used individually for bladder drainage or irrigation, or conjointly in a closed system for alternating bladder irrigation and drainage.

The receptacles R–1, R–2 and R–3, and their related parts, are made from water impervious, flexible, plastic materials, preferably transparent. Their structuring is such as to adapt them for sterilized packaging and for ready disposal after a one-time use, as later will be explained more fully.

The receptacle R-1, as shown in FIG. 1, is a flat unit composed of two superimposed pieces of material bonded along their perimeters and to which the above-mentioned flutter valve, tubes, pouches, and suspension straps are attached, as presently will be explained. This form of receptacle is designed primarily for use in bladder drainage. The receptacle R-2, as shown in FIG. 8, is made as a satchel-bottomed bag dimensioned, scored and formed so as to be expanded from a flat collapsed condition into the flat-bottom bag the face walls of which are sealed along one end to provide a flat closure strip on which the above-mentioned flutter valve, tubes, connections and suspension straps are attached, as presently will be explained. This form of receptacle is designed for use either as a drainage receptacle or as a container for irrigation use. The receptacle R-3, as shown in FIG. 11, is a small, flat, and narrow unit designed for collecting a relatively small sample of urine for laboratory testing.

The flutter valve 15, secured in each of these receptacles R-1, R-2 and R-3, is formed of a pair of superimposed layers 26 and 27 of flexible, heat sealable, plastic material, such as poly vinyl chloride, which are electronically welded together along the two lateral margins, as indicated by the short, heavy lines 28 in FIG. 4. The valve is pressure sealed along the one end to a nipple 29 but no pressure whatsoever is applied to the margins. Such electronic welding from end to end of the superimposed layers 26 and 27, provides a more effective flutter valve 15 than ever before has been possible by other means of formation. Electronic welding does not deform the marginal portions of these superimposed lays 26 and 27 and does not stretch the material between, as inevitably occurs with the heretofore-used pressured-die bonding methods. Pressured-die bonding of such material tends to so displace the marginal portions of the lawers 26 and 27, inwardly along the bonds, as to dispose the layers very slightly out of firm surface-to-surface contact inwardly along these bonds. With electronic welding, however, there is no displacement, stretching, or deformation whatever of these superimposed layers 26 and 27 and these layers 26 and 27 have such a flat surface-to-surface engagement throughout their entire areas as to cause a resumption of surface-to-surface contact instantly after separation by the passing of fluid through the valvle 15 by way of the nipple 29. Consequently, the unsealed end of the valve is self-closing and opens only for internal pressure. Thus, the possibility of any backflow, of gases and/or fluid from the receptacle to the drainage tube from the patient, is absolutely eliminated.

The flutter valve 15 is secured in place in each of the receptacles R-1, R-2 and R-3 by welding or otherwise securing the nipple 29 between the welded together margins of the material comprising the receptacles, the nipple 29 projecting exteriorly of the top edge of the respective receptacle, for telescopic connection therewith of the tubing 31 leading from the patient.

The receptacle drain tube 16, for the receptacle R-1, has an integrated attachment to the bottom of the receptacle by any suiable means and is of a length approximately the height of the receptacle. Preferably the retaining pocket 19 is a rigid, plastic, cylindrical unit in the upper, closed end of which is a conventional porous plug or ball-check-valve 32. The pocket 19 is integrated with one face of the receptacle a short distance below the upper end and the interior of the pocket is dimensioned so as to permit ready insertion of the open end 33 of the tube 16 yet to frictionally hold the tube end 33 in the pocket against release unless it is deliberately pulled out. The pocket 19 retains the open end 33 of the drainage tube 16 at a point normally above any fluid level likely to be attained in the normal use of the receptacle R-1. The valve 32, however, serves two functions, namely, to permit the ready escape of gas and air and to automitically close against the entry of any foreign matter into the drain tube 16.

The drainage tube 17, for the receptacle R-2, is a short section integrated with one wall of the receptacle, slightly above the bottom thereof and adjacent one end. When the tube 17 is not in use for draining the receptacle R-2, the tube is closed with a tight fitting cap 34 or a suitable machnical clamp. In addition to the drainage tube 17, the receptacle R-2 has a screw-plug 35, in the bottom of the receptacle, for effecting rapid filling or complete emptying and flushing of the receptacle.

The drainage tube 18 for the receptacle R-3 is here shown integrated with the receptacle directly adjacent an upper corner at the end in which the flutter vaive 15 is disposed. This is so arranged as to make most convenient the pouring of portions of the contents from the receptacle R-3. Normally the tube 18 is closed by a friction cap 36.

The pouch 20 for the bactericidal material is formed of a strip of perforate, flexible, plastic folded over and bonded transversely and along the one edge. The pouch contains a quantity of pellets 37 of a particular form and made from a novel material hereinafter described. The pouch 20 is of such a length as to permit the securing of one end 38 in the adjacent bonded margin of the receptacle R-1 and the opposite end 39 spot bonded to the opposite walls of the receptacle inwardly below and beyond the free inner end of the flutter valve 15. Thus, the pouch 20 is positioned closely below the open free end of the flutter valve 15 (FIG. 2), and as the fluid is discharged from the flutter valve 15 it will flow over the pouch 20 and some of it will enter the pouch 20 through the perforations 20' and pass over the bactericide 37 and then back into the receptacle, the liquid dissolving and carrying off sufficient material to immunize the entire body of fluid collected in the receptacle.

The pouch 21 consists of a perforate piece of flexible plastic adhered to the inner face of the receptacle wall in opposition to the pocket 19 and over an opening 41, in that wall, which communicates with the pocket 19 at its upper end. The pouch 21 is filled with grains of a conventional deodorant 42 such as activated charcoal. Thus, gases arising from within the receptacle R-1 will tend to enter the pouch 21 through the perforations 21' and pass out through the opening 41, into the pocket 19 and thence out through the valve 32 to the ambient air. Such emitted gases will be freed of odor by the deodorant 42.

The suspension strap 22 for the R-1 receptacle comprises a pair of flexible, plastic strips 43 integrated at their ends and to the top margin of the receptacle, medially of its side edges. Intermediate their ends, the straps 43 are bonded together between unbonded portions the latter of which provide open loops 44 and 45, either of which could be inserted over a rod or arm (not shown) to suspend the receptacle in use position. The lower loop 44 is provided and dimensioned to permit the insertion of a belt (shown in dotted outline FIG. 7) so that the receptacle R-1 may be worn by an ambulatory patient. The upper loop 45 is particularly adapted for use with a specially-formed bracket 46, the form and function of which will be explained presently.

The suspension straps 23, of which there are two used on the receptacle R-2, each comprises a strip of flexible plastic one end of which is integrated with a folded-over and sealed marginal portion 47 of the receptacle. Each strap 23 has a series of transverse slots 48 formed therein adjacent the receptacle end, and mounts a stiff hook element 49 on the other end. The slots 48 and the hook 49 are so formed and related that the hook 49 can be inserted through the upper one of a pair of the slots 48 and then re-entered through the lower slot of the pair to convert the strap 23 into a loop 51 for embracing a support from which to suspend the receptacle R-2 in use position. The particular manner of engaging the hook 49 in the strap slots, provides a positive fastening which assures against accidental dislodgement.

The suspension trunnions 24, in the form of headed pins, are secured to the opposite ends 52 of the receptacle R-2, near the bottom 53 thereof. These trunnions 24 may be attached to suitable hanger means, such as an overhead harness (not shown), to suspend the receptacle R-2 in inverted position for use as an irrigation supply means, as shown in FIG. 10.

The drainage tube brace 25, as here shown in FIG. 1, is a strip of material secured at one end to the suspending strap 22, a short distance above the upper end of the receptacle R-1, so as to dispose an end loop 54 in axial alignment with the nipple 29 of the flutter valve 15. Thus, the insertion of the catheter drain tube 31 through the loop 54, in the process of telescoping the tube end over the valve nipple 29, has two advantageous results. For one thing, the brace 25 guards against the tube 31 being bent over or crimped at its connection to the receptacle so as to cause shutting off of fluid flow through the tube 31 into the receptacle, possibly with serious consequences. For another thing, the brace 25 ensures against accidental disconnection of the tube 31 from the valve nipple 29.

The receptacle R-2, as hereinbefore mentioned, is designed for use either for bladder drainage or bladder irrigation. To that end the receptacle has the additional facilitates of a pair of auxiliary ports 56 and 57 formed in the folded over end edge portion 47. The port 56 embraces a nipple 58 for use in introducing medication into the receptacle. Such nipple 58 is equipped, exteriorly of the receptacle, with a self-sealing cap or plug 59 adapted for penetration by the needle of a syringe for supplying medication material to the contents of the receptacle. The port 57 embraces a nipple end 61 of a spinning disc or float-ball flow indicator 62 adapted for attachment of a tube 63 required for connection to a catheter when the receptacle R-2 is to be used for bladder irrigation, as will be explained presently. A wire-cored plastic clamp 64 is arranged at the outward end of the indicator 62 to close off passage therethrough when the receptacle R-2 is not used for bladder irrigation. Also, the port 57 is provided with an inwardly closing ball check valve 57' and the flow indicator 61 is removable, to accommodate the receptacle R-2 for use as a drainage receptacle. It will be understood that when the receptacle R-2 is not used for drainage purposes the inlet tube 29, leading to the flutter valve 15, will be capped with a friction cap 29' to seal the inlet against contamination.

The receptacle R-3, as hereinbefore mentioned, is designed for use in acquiring urine samples for laboratory examination. An accessory to this receptacle is a patch pocket 66, on one face thereof, for the insertion of a folded data slip having to do with pertinent facts about the patient from whom the sample of urine is taken.

As shown in FIG. 7, the bracket 46 provides for a suspension of the drainage receptacle from a patient's bed frame in such a position that the receptacle is located inwardly of and below the bed side-rail, completely out of position to be inadvertently contacted by hospital personnel—or any others for that matter—moving about a patient's bed.

In the form shown, the suspension bracket 46 is made from a single, fairly rigid, piece of wire bent to the shape of an elongate hollow rectangle, the ends 67 of the wire opposing each other axially to provide one of the ends of the rectangle. The closed end 68 of the rectangle is then doubled upon itself, in the longitudinal direction of the rectangle, so that each of the side members forms a clevis-like portion 69 adapted to snugly embrace the horizontal flange or leg 70 of a longitudinal angle member of the bed frame. As shown the remaining portion 71 of the bracket is disposed to lie in a plane forming an acute angle with the plane of the depending leg 72 of the bed frame so as to position the ends 67 of the bracket inwardly of the bed frame.

In use, the bracket 46 is first threaded through the loop 45 in the hanger strap 22, as shown in FIG. 7. This being done the clevis portions 69 of the bracket 46 are seated over the bed frame flange 70 with the hanger strap 22 depending along the outer face of the bed-rail flange 72. Then the hanger strap 22 is inserted, edgewise, through the opening between the ends 67 of the inwardly disposed end of the bracket 46 to position the strap 22 to hang vertically therefrom, as shown in FIG. 7. The plane of the receptacle R-1, hanging from the strap 22, will then be in the plane of that portion of the hanger strap 22 below the bracket end portion 67, suspending the receptacle R-1 below and well inwardly of the bed rail leg 72. In such position there is practically no likelihood of the receptacle R-1 being inadvertently bumped or otherwise contacted by personnel moving about the patient's bed.

As before mentioned the bactericidal element 20 is made to contain pellets of a bactericide material which becomes dissolved in the fluid collected in the receptacle and not only destroys any bacteria therein but at the same time prevents fermentation and decomposition and tends to minimize odor Preferably the bactericide is a slow dissolving or sustained release material in pellet form so that its release will be in proportion to the quantity of liquid involved and hence can be prolonged for as long as 15 to 20 days, thus retaining the full advantages deriving from the fully closed system. For this purpose I have found that quaternary ammonium chloride compounds are particularly suitable. For example I have successfully used ammonium chloride together with a glassy sodium phosphate to form a pellet enclosing, at its center, a suitable anionic dye to be released when the pellet becomes used up and, by coloring the liquid, give a visual indication that the bactericidal material has become exhausted. Such a pellet is shown in section in FIG. 13, wheerin the dye center is indicated at 37'.

The use of this bactericidal means serves to keep the drainage bag sterile and thus obviates the need for changing the bag as it becomes full, by merely draining the bag at appropriate intervals, by means of the drain tube 16 or 17, the hereindescribed system can be kept in continuous operation for relatively long periods.

At any time when a urological patient requires the use of drainage and collecting apparatus, absolute sterility of equipment and its operation must be strictly maintained. This is particularly important when irrigation procedures must also be employed. Under such circumstances it becomes imperative to employ a closed system involving a drainage receptacle and an irrigating receptacle, both connected to a catheter in such a way that no connection need ever be broken while the system is in use. The hereinshown and explained receptacles R-1 and R-2 are uniquely adapted for such a closed system, as illustrated in FIG. 10; and as shown such a system involves the use of a particular form of T-connector 73 for connecting the inflow tube 31 of the receptacle R-1, to a tube 74 leading to a catheter 75 and also by a tube 76, connecting the middle leg of the T-connector to the receptacle R-2 through the flow indicator 62. As shown, the tube 76 includes a force pump or bulb 77 arranged for unidirectional flow toward the catheter.

The T-connector 73 has the ends of its arms 78 knurled or otherwise formed for the secure connection of the tubing 31 and 74. The pressure bulb or hand pump 77 has a nippled end 79 inserted into the stem part 80 of the T-connector 73 and, as shown, the nipple 79 houses a spring-closed ball-valve 81 that permits only the forced flow of the irrigating fluid from the receptacle R-2 to the catheter 75 but prevents any back-flow from the tube 74. The pressure bulb 77 is also provided with a self closing back-pressure valve 82 to prevent back flow toward the reservoir R-2 when the bulb is operated.

In the course of operation of the system for irrigation the tube 31 is pinched manually, adjacent the T-connector 73, whenever the pump 77 is being actuated to force fluid from the receptacle R–2 through the tube 76 and catheter 75 into a patient's bladder. This will prevent the irrigation fluid from shunting to the drainage receptacle R–1 and release of the tube 31, when irrigation has been accomplished, will immediately permit resumption of normal drainage flow from the catheter to the receptacle R–1. When the pump 77 is not operated the spring closed valve 81 will sustain the fluid "head" in the receptacle R–2 and prevent flow therefrom into the normal drainage lines 31–74.

The herein-shown and described receptacle R–1 and R–2, with their respective accessory parts, being structured from conventional plastics make for their economical manufacture in sterilized packages conveniently storable, ready for instant, conventional, one-time use. The receptacles R–1 and R–2 may be provided in separate packages or they may be made available in a single package, interconnected with all the tubing and accessories shown in FIG. 10, as a closed system ready for immediate, one-time use for bladder irrigation and drainage.

Such equipment is usable precisely as is the currently-available, repeated-use equipment. However, this one-time-use, plastic equipment permits practicing the best aseptic technique with the greatest assurance of eliminating urinary track infections. Where patient treatment has to extend over a considerable period of time, the herein-described equipment permits the most facile and sanitary removal of collected material, replenishing of irrigation fluid, and addition of medication that has to be done over that period of time, with the assurance of accurate determination of all conditions incident to the best possible patient treatment.

It will be understood that numerous details of the system and its components herein-described may be altered or omitted without departing from the spirit of the invention as dened by the following claims.

I claim:

1. Equipment of the class described comprising, a fluid receptacle having an inflow tube fixedly connected to said receptacle for drainage of liquid thereinto, a unidirectional valve means on the end of said tube, said valve means comprising a pair of superimposed layers of flexible plastic in face-to-face contact with each other and welded together along narrow portions of their respective lateral margins without deformation of the said layers and along one end to embrace the inner end of the inflow tube and to dispose the valve means in suspension from the said inflow tube, the other end of the valve means extending freely within the receptacle, and a perforate container holding a bactericidal substance fixed in the receptacle directly below the outlet end of the flutter valve for immunizing the inflowing fluid.

2. Equipment of the class described comprising a closed fluid receptacle having an inflow tube fixedly connected to said receptacle for drainage of liquid thereinto, a unidirectional valve means on the inner end of said tube, and a fluid permeable container holding pellets made of a quaternary ammonium chloride compound disposed within the receptacle.

3. Equipment of the class described as set forth in claim 1 wherein a perforate container holding a bactericidal substance is fixed in the receptacle directly below the outlet end of the flutter valve for immunizing the inflowing fluid, and wherein said bactericidal substance is in the form of solid individual pellets each having a water soluble core containing a dye.

4. Equipment of the class described as set forth in claim 3 wherein the said pellets are formed with a water soluble core containing a dye.

5. Equipment of the class described comprising, a fluid receptacle made of flexible plastic material and having an inflow tube welded into its upper margin for drainage of fluid thereto, a flutter valve depending from the inner end of said inflow tube and formed of a pair of superimposed layers of flexible plastic sheet material in face-to-face contact welded together along narrow portions of their respective lateral margins without deformation of said layers, said layers being welded along one end to embrace the inner end of the inflow tube and close the said one end thereabout, a flexible supporting strap fixed to the upper margin of the receptacle adjacent said inflow tube for suspending the receptacle in use position, and a laterally extending brace on said strap having means aligned with said inflow tube for supporting a flexible extension of the inflow tube to prevent pinching of the inflow tube and said valve at the entrance to the receptacle.

6. Equipment of the class described comprising, a flexible plastic fluid receutacle having an inflow tube connected to its upper end for drainage into the receptacle, a unidirectional flutter valve attached to the said inflow tube and suspended therefrom within the receptacle, a supporting strap fixed to the upper end of the receptacle for suspension of the receptacle in use position, a fluid drain tube connected to and leading from the lower end of the receptacle, and a downwardly opening pocket fixed on the receptacle adjacent the upper end thereof and dimensioned to receive and frictionally retain the discharge end of the said drain tube.

7. Equipment of the class described as set forth in claim 6 wherein a gas vent is provided in the upper end of said pocket and a perforate pouch containing a deodorizing agent is fixed on the receptacle wall interiorly of the receptacle adjacent the pocket, the said wall having an opening therethrough adjacent the upper end of said pocket for providing communication between said pouch and the pocket.

8. Equipment of the class described comprising,
(a) a flexible plastic receptacle, for the collection of urological drainage fluids,
(b) a nipple fixed in the upper end of the receptacle with the opposite ends extending inwardly and outwardly of the receptacle,
(c) a unidirectional flutter valve on said nipple interiorly of the receptacle and formed of a pair of superimposed layers of flexible plastic sheet material electronically welded together in face-to-face contact along a narrow portion of their respective lateral margins,
(d) a drain tube connected to the lower end of the receptacle, and
(e) a downwardly opening socket fixed on the outer surface of the receptacle wall adjacent the upper end thereof and dimensioned to receive and frictionally retain the discharge end of the tube.

9. Equipment of the class described as set forth in claim 8 wherein a perforate pouch containing a deodorizing agent is fixed on the interior of the said receptacle wall in registry with the socket, said wall having an opening to provide communication between said pouch and said socket, and said socket having means at its upper end for venting gas to atmosphere, said vent means being adapted to prevent the outward flow of liquid.

10. Equipment of the class described as set forth in claim 8 wherein the receptacle is normally closed to atmosphere, a perforate pouch containing a deodorizing agent fixed on the interior of the said receptacle wall in registry with the socket, said wall having an opening to provide communication between said pouch and said socket, said socket having means at its upper end for venting gas to atmosphere, and a valve means is included in said vent means for preventing entry therethrough from atmosphere.

11. Equipment of the class described comprising a closed fluid receptacle having an inflow tube fixedly connected to the receptacle for drainage of liquid thereinto, and a fluid permeable container holding pellets made of a slow dissolving bactericide material formed about a core containing a water soluble dye is disposed within the receptacle.

References Cited by the Examiner

UNITED STATES PATENTS

| | | | |
|---|---|---|---|
| 2,643,969 | 6/1953 | Mahon | 128—284 X |
| 2,784,716 | 3/1957 | Broman | 128—227 |
| 2,800,905 | 7/1957 | Simmons et al. | 128—227 |
| 2,883,985 | 4/1959 | Evans | 128—295 |
| 3,237,624 | 3/1966 | Jinkens et al. | 128—275 |

ROBERT E. MORGAN, *Acting Primary Examiner.*

RICHARD A. GAUDET, *Examiner.*

C. F. ROSENBAUM, *Assistant Examiner.*